(12) United States Patent
Komdeur

(10) Patent No.: US 6,443,688 B1
(45) Date of Patent: Sep. 3, 2002

(54) METHOD AND APPARATUS FOR TURNING A ROLL

(75) Inventor: Kasper Komdeur, Jenison, MI (US)

(73) Assignee: Schnadig Corporation, Des Plaines, IL (US)

( * ) Notice: Subject to any disclaimer, the term of this patent is extended or adjusted under 35 U.S.C. 154(b) by 0 days.

(21) Appl. No.: 09/877,435

(22) Filed: Jun. 8, 2001

(51) Int. Cl.$^7$ .......................................... B65G 47/248
(52) U.S. Cl. .................. 414/778; 280/47.12; 414/816; 414/911
(58) Field of Search ................. 280/47.12, 47.131; 414/774, 775, 778, 816, 911

(56) References Cited

U.S. PATENT DOCUMENTS

| | | | | |
|---|---|---|---|---|
| 2,375,338 A | * | 5/1945 | Alexander | 280/47.131 |
| 3,016,158 A | | 1/1962 | Horton | |
| 3,395,813 A | | 8/1968 | Bruce et al. | |
| 3,650,419 A | * | 3/1972 | Upshur et al. | 280/79.3 X |
| 3,970,205 A | * | 7/1976 | Del Puppo | 414/778 X |
| 4,067,451 A | | 1/1978 | Winters | |
| 4,119,214 A | | 10/1978 | Blom | |
| 4,173,428 A | * | 11/1979 | Thornberg | 280/47.36 X |
| 4,430,040 A | | 2/1984 | Halmos | 414/783 |
| 4,498,841 A | * | 2/1985 | Wickström | 414/778 |
| 4,705,283 A | * | 11/1987 | Kleisath | 280/47.12 |
| 4,718,813 A | | 1/1988 | Kehlenbach | 414/684 |
| 4,772,035 A | * | 9/1988 | Danial | 280/47.3 |
| 5,035,570 A | | 7/1991 | Petersson | 414/778 |
| 5,125,495 A | * | 6/1992 | Ganzberger et al. | 414/774 X |
| 5,181,731 A | | 1/1993 | Gustavsen | 280/47.131 |

* cited by examiner

*Primary Examiner*—Janice L. Krizek

(57) ABSTRACT

A roll of wound material is upended or turned 90° by a pivotable cart and a conventional forklift apparatus. The roll is supported on a pallet and has a central opening which extends substantially vertically. The cart includes a pair of perpendicular walls and a roller which is mounted on the walls adjacent the intersection between the walls. The forklift first loads the pallet and the roll onto one of the walls of the cart which extends horizontally. The forklift is then arranged so that one of its tines is below said one horizontal wall and a second tine is laterally outward of the roller. The forklift is raised to pivot said one wall about the roller until the second wall pivots into engagement with the second tine. The fork lift is then lowered so that the second wall pivots into a horizontal position. The roll is then supported on the second wall with the central opening extending horizontally.

11 Claims, 3 Drawing Sheets

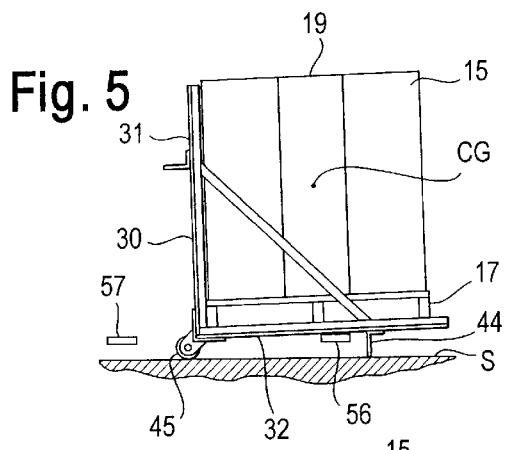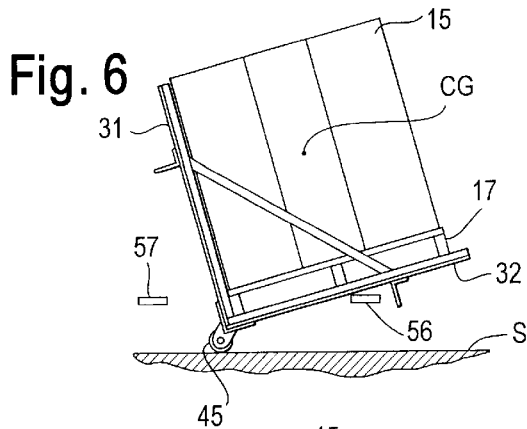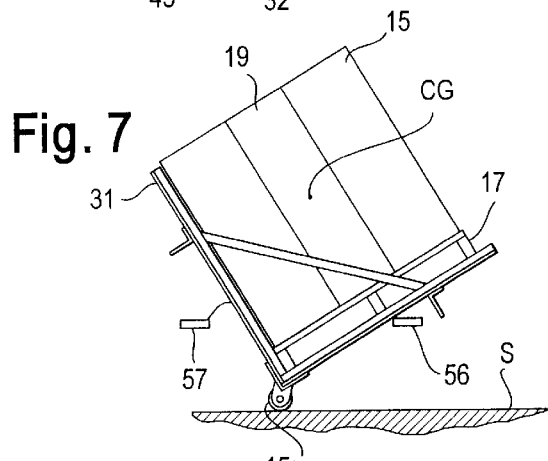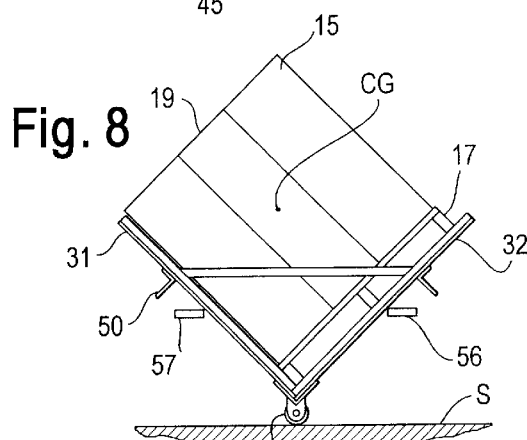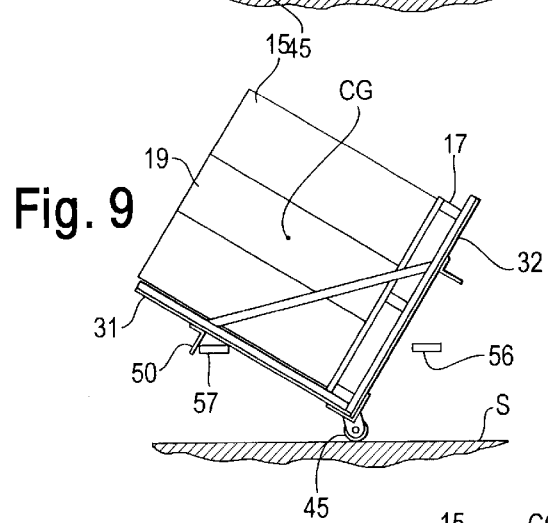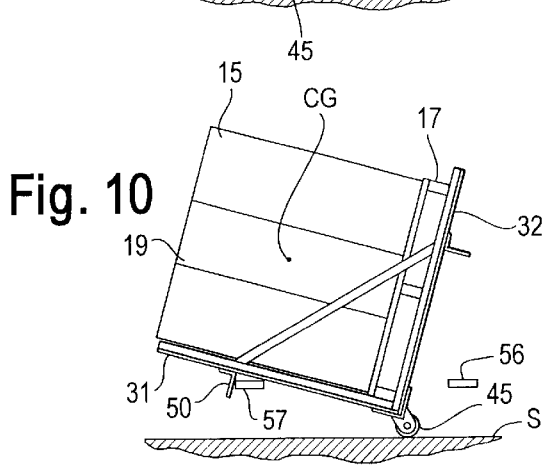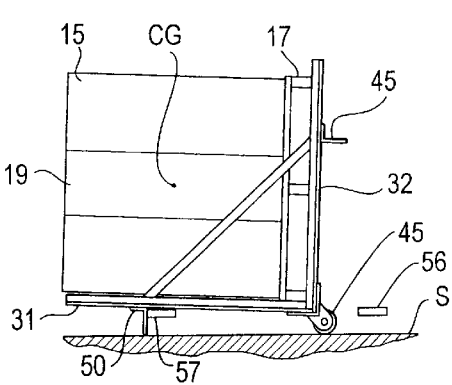

METHOD AND APPARATUS FOR TURNING A ROLL

BACKGROUND

This invention relates to an apparatus and method for turning a roll or coil which has a substantially vertically extending central opening.

It is often desirable to turn or rotate a heavy roll or coil of material so that the roll can be mounted for unwinding with the central opening of the roll extending horizontally. For example, machines which are used to form molded or formed plastic products utilize a roll of plastic sheet material. The plastic sheet is unwound from the roll and advanced through the machine. The roll is supported for unwinding by a spindle, mandrel, chuck or the like which extends into the central opening of the roll.

Although the roll is unwound when its central opening extends horizontally, the roll is usually shipped and stored with the central opening extending vertically so that the roll rests on one of its flat ends. Before the roll can be mounted on the device which unwinds the roll, the roll must be turned 90°. If the roll is too heavy to be turned manually, a mechanical turning device must be used.

Many mechanical turning devices have been proposed and are available commercially. Representative devices are described in U.S. Pat. Nos. 3,016,158, 3,395,813, 4,067,451, 4,430,040, and 4,718,813. However, such turning devices are expensive.

SUMMARY OF THE INVENTION

The invention provides an inexpensive apparatus and method for turning heavy rolls or coils. The invention uses an inexpensive cart and a conventional forklift apparatus which usually already available for transporting the rolls inside the factory.

The cart includes a pair of perpendicular or orthogonal walls and rollers which are mounted on the cart adjacent the intersection between the walls. One or more rolls are lifted onto a horizontally extending wall of the cart by a forklift apparatus. The central opening of the roll extends vertically. One of the tines of the forklift apparatus is inserted under the horizontal wall and is raised until the other wall rotates into engagement with the other tine. The forklift is then lowered to allow the other wall to continue to rotate toward a horizontal position. When the other wall is horizontal, the central opening of the roll extends horizontally.

DESCRIPTION OF THE DRAWING

The invention will be explained in conjunction with an illustrative embodiment shown in the accompanying drawing, in which

FIGS. 5–11 illustrate the rolls and pallet supported on the cart and the sequence of steps for turning the rolls.

DESCRIPTION OF SPECIFIC EMBODIMENT

Figure 1:
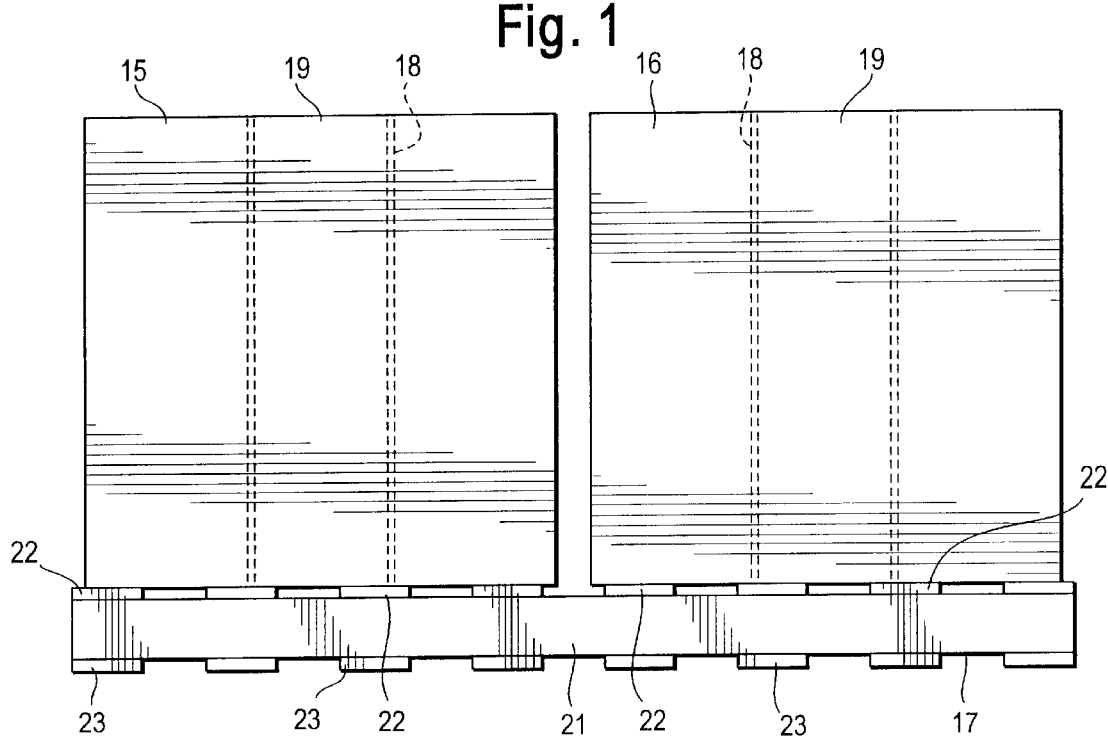
FIG. 1 is a front view of a pair of rolls of wound plastic sheet supported on a pallet.
Figure 2:
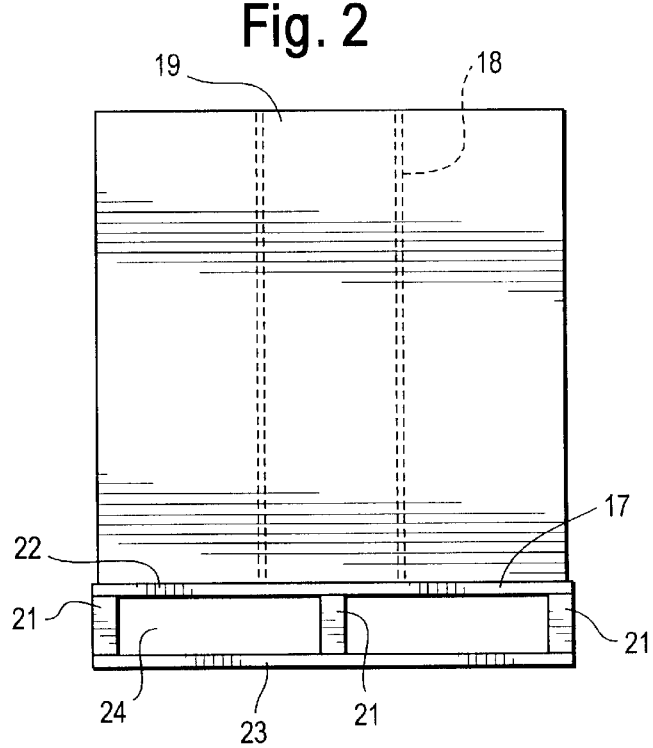
FIG. 2 is a side view of the rolls and pallet.

Referring to FIGS. 1 and 2, a pair of cylindrical rolls or coils 15 and 16 are supported on a conventional pallet 17. Each roll is formed from a sheet of plastic or other material which is wound or coiled around a central core 18. The core forms an axially extending central opening 19 in the roll. In FIGS. 1 and 2 the central opening of each roll extends vertically so that the roll is supported on one of its flat ends.

The pallet 17 includes three elongated beams or stringers 21, a top set of cross slats 22, and a bottom set of cross slats 23. The beams 21 form a pair of openings 24 into which the two tines of a conventional forklift apparatus can be inserted to raise the pallet and the rolls.

Figure 3:
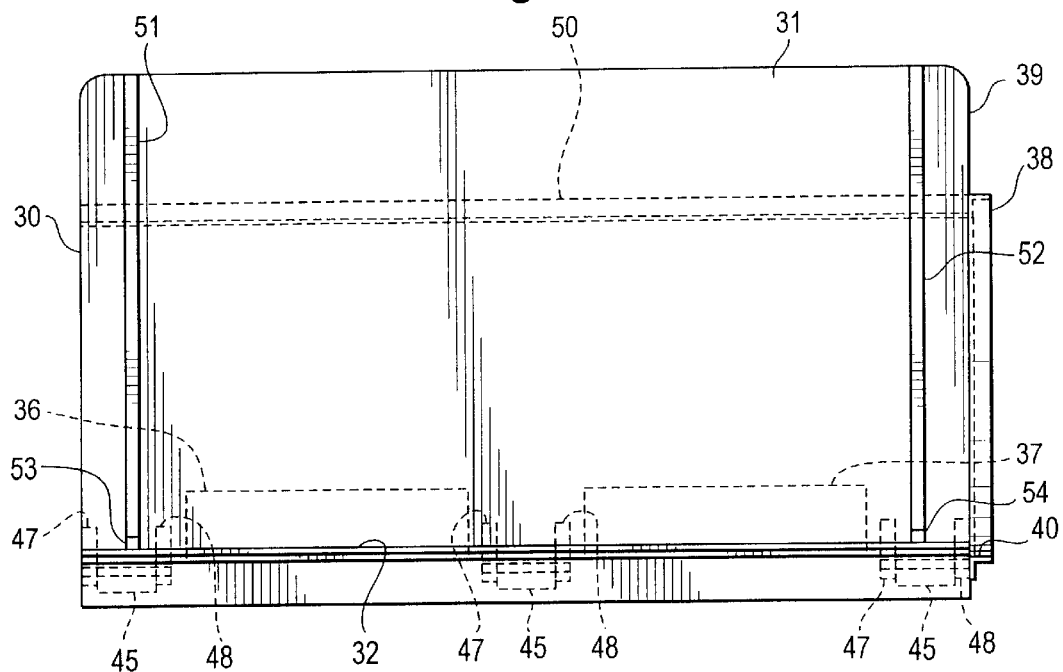
FIG. 3 is a front view of a cart for turning the rolls.
Figure 4:
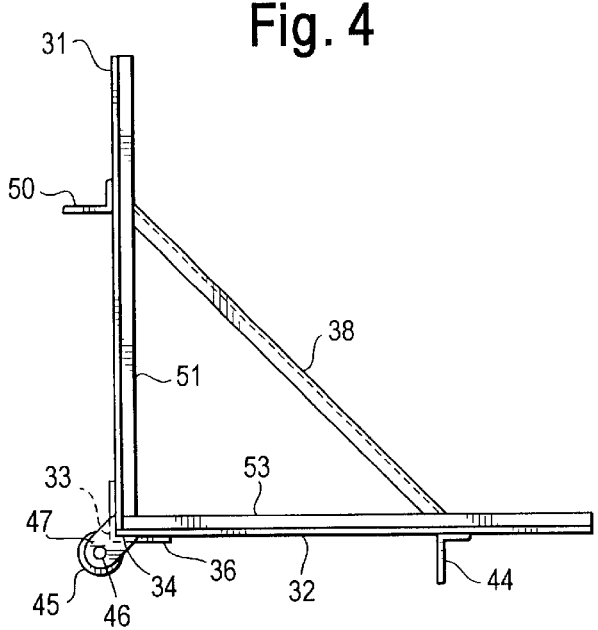
FIG. 4 is a side view of the cart.

Referring now to FIGS. 3 and 4, a cart 30 includes a pair of walls or plates 31 and 32 which extend perpendicularly to each other. The wall 31 includes an inside side edge 33, and the wall 32 includes an inside side edge 34. The side edge 33 abuts the wall 32 adjacent the side edge 34 to form an intersection between the two walls. The walls are connected by a pair of angles 36 and 37 which are welded or otherwise secured to the walls. The walls are reinforced by a brace 38 which is connected to outside edges 39 and 40 of the walls.

The wall 32 is supported in a horizontal position in FIGS. 3 and 4 by an angle 44 which is secured to the outside surface of the wall and by three wheels or rollers 45. Each wheel is rotatably supported on an axle for rotation about an axis 46 by spaced-apart plates 47 and 48 which are welded to the walls 31 and 32 adjacent the intersection between the walls. The plates 47 and 48 extend at about a 450 angle to the plane of each of the walls 31 and 32 so that the wheel is spaced equidistant from each plane.

As will be explained more fully hereinafter, the cart 30 can rotate about the wheels 45 so that the wall 31 rotates counterclockwise to a horizontal position. The wall 31 is supported in a horizontal position by an angle 50 and the wheels 45.

A pair of bars 51 and 52 are attached to the inside surface of the wall 31, and a pair of bars 53 and 54 are attached to the inside surface of wall 32. The bars act as stops to confine the pallet 17 against movement. The bars can also be secured together to provide additional reinforcement to the walls 31 and 32.

Referring now to FIG. 5, when the rolls 15 and 16 are to be turned, the pallet 17 is lifted by a conventional forklift apparatus onto the cart 30. The forklift includes a pair of spaced-apart tines 56 and 57 which are inserted into the openings 24 to raise the pallet. For some rolls it might be possible to lift the rolls onto the cart without using a pallet or other supporting structure.

In FIG. 5 the cart rests on a horizontal surface S, and the rolls are supported by the horizontal wall 32 of the cart. The central openings 19 of the rolls extend vertically.

After the pallet and the rolls are loaded onto the cart, the tines of the forklift are withdrawn from the openings 24 in the pallet. The tines are then moved so that the right tine 56 is underneath the wall 32 of the cart and the left tine 57 is laterally outwardly of the wheels 45. The tine 56 is advantageously positioned to the left of the angle 44 but far enough from the wheels 45 to provide a sufficient lever arm for rotating the cart.

The forklift is then operated to raise the tines 56 and 57 as illustrated in FIG. 6. As the tine 56 is raised, the walls 31 and 32 rotate or pivot about the wheels 45, and the rolls 15 and 16 rotate counterclockwise.

FIG. 7 illustrates a slightly higher position of the tines 56 and 57. The cart and the rolls are rotated slightly more in the counterclockwise direction. The center of gravity CG of the rolls, pallet and cart is to the right of the wheels 45. As the cart rotates, the wheels 45 roll along the surface S toward the right tine 56.

In FIG. 8 the tines have been raised to a position in which the center of gravity CG is almost directly above the rotational axes of the wheels 45. The left tine 57 is very close to the wall 31 and is in position to support the wall 31 almost immediately after the center of gravity CG passes over the axes of the wheels.

In FIG. 9 the tines have been raised sufficiently to move the center of gravity CG to the left of the axes of the wheels. The wall 31 of the cart 30 rotates into engagement with the left tine 57. The angle 50 is engageable with the tine 57 to prevent the cart from rolling on the wheels 45 too far to the right.

Once the wall 31 engages the left tine 57, the tines can be lowered as illustrated in FIG. 10. The cart and the rolls continue to rotate about the wheels 45.

In FIG. 11 the tines 56 and 57 have been lowered sufficiently so that the wall 31 is supported in a horizontal position by the wheels 45 and the angle 50. The central openings 19 of the rolls 15 and 16 extend horizontally. The tines 56 and 57 can then be withdrawn from below the cart.

The rolls 15 and 16 are now in position to be mounted on the unwind device of the machinery which uses the rolls. Each of the rolls can be removed from the cart by, for example, inserting one of the tines 56 or 57 into the central opening 19 or by inserting the spindle or mandrel of the unwinder into the central opening.

The invention enables the turning of rolls 15 and 16 through an angle of 90° to move the central openings from a vertical position to a horizontal position by the cart 30 and a conventional forklift apparatus which is readily available in most manufacturing facilities. Since the forklift apparatus is already available, the only capital expenditure is for the cart, which can be manufactured relatively inexpensively. description of specific embodiments of the invention was set forth for the purpose of illustration, it will be understood that many of the details hereingiven can be varied considerably by those skilled in the art without departing from the spirit and scope of the invention.

I claim:

1. A method of turning a roll of wound material having a central opening which extends substantially vertically comprising the steps of:

loading the roll on a pivotable cart having a first wall which extends substantially horizontally, a second wall which extends substantially vertically, and a pivoting member adjacent the intersection between the first and second walls, the roll being supported by the first wall, advancing a forklift apparatus having a pair of tines toward the cart so that a first tine is inserted below the first wall of the cart and a second tine is laterally outward of the second wall, raising the first and second tines so that the first wall pivots about said pivoting member until the second wall pivots into engagement with the second tine, and lowering the first and second tines so that the second wall pivots into a substantially horizontal position and the central opening of the roll extends substantially horizontally.

2. The method of claim 1 in which said advancing step positions the second tine far enough from the second wall so that during said step of raising the first and second tines the center of gravity of the roll and the cart passes over the pivoting member.

3. The method of claim 2 in which the second wall engages the second tine just after the center of gravity passes over the pivoting member.

4. The method of claim 1 in which said pivoting member is a roller and during said step of raising the first and second tines the roller moves toward the first tine.

5. The method of claim 4 in which during said step of lowering the first and second tines the roller moves toward the first tine.

6. The method of claim 1 in which said pivoting member is a roller and said cart includes a first support bracket on the first wall and a second support bracket on the second wall, the first wall being supported in the substantially horizontal position by the roller and the first support bracket, during said advancing step the first tine is inserted between the roller and the first support bracket, and after said step of lowering the first and second tines the second wall is supported in a substantially horizontal position by the roller and the second support bracket.

7. The method of claim 6 in which during said step of lowering the first and second tines the second tine engages the second support bracket so that the second tine does not move along the second wall beyond the second support bracket.

8. A pivotable cart for use with a forklift apparatus having a pair of spaced-apart tines, the cart comprising:

first and second walls which extend substantially perpendicularly, each of the walls having an edge which is joined to the other wall along an intersection between the walls, a roller rotatably mounted on at least one of the walls adjacent said intersection, a first support bracket attached to the first wall so that the first wall can be supported in a substantially horizontal position on a horizontal support surface by the roller and the first support bracket with the first wall spaced above the support surface, and a second support bracket attached to the second wall so that the second wall can be supported in a substantially horizontal position on a horizontal support surface by the roller and the second support bracket with the second wall spaced above the support surface, the first and second support brackets being located substantially equidistant from said intersection.

9. The cart of claim 8 including a brace extending angularly between the first and second walls and attached to the walls.

10. The cart of claim 8 including a first pair of spaced-apart abutments on the first wall and a second pair of spaced-apart abutments on the second wall for confining an object between the abutments.

11. The cart of claim 8 in which each of said first and second walls extends in a plane, at least one roller support plate is connected to said walls and extends from said walls at an angle of about 45° from each of said planes, said roller being rotatably mounted on said roller support plate and being positioned substantially equidistant from each of said planes.

* * * * *

UNITED STATES PATENT AND TRADEMARK OFFICE
CERTIFICATE OF CORRECTION

PATENT NO.   : 6,443,688 B1
DATED        : September 3, 2002
INVENTOR(S)  : Kasper Komdeur It is certified that error appears in the above-identified patent and that said Letters Patent is hereby corrected as shown below:

<u>Title page,</u>
Item [73], should read as follows:

-- Assignee:   Lion Rock Holdings, L.L.C.
               Grand Rapids, Michigan --

Signed and Sealed this

Twentieth Day of May, 2003

JAMES E. ROGAN
*Director of the United States Patent and Trademark Office*